June 7, 1966 J. H. BOYD ETAL 3,254,686
METHODS AND APPARATUS FOR HARVESTING TIMBER
Filed July 15, 1963 9 Sheets-Sheet 1

Fig. 1.

June 7, 1966  J. H. BOYD ETAL  3,254,686
METHODS AND APPARATUS FOR HARVESTING TIMBER
Filed July 15, 1963  9 Sheets-Sheet 5

Fig. 13.

United States Patent Office

3,254,686
Patented June 7, 1966

1

3,254,686
METHODS AND APPARATUS FOR HARVESTING TIMBER
John H. Boyd, Beaconsfield, Quebec, and Albert K. Jordan, Woodstock, Ontario, Canada, assignors to Timberland-Ellicott Limited, Woodstock, Ontario, Canada
Filed July 15, 1963, Ser. No. 295,019
Claims priority, application Canada, Jan. 17, 1963, 866,779
12 Claims. (Cl. 144—312)

This invention relates to improvements in methods and apparatus for harvesting timber, and more particularly to the combination of a tractor or like power operated vehicle and a mechanism mounted on such vehicle that is capable of carrying out the dual functions of piling and slashing felled trees.

In timber cutting-out operations conducted according to this invention, trees in the forest will be felled, limbed and topped in the manner conventional in a tree-length logging operation. A number of trees after being felled and subjected to preliminary processing in this way will then be assembled at a suitable location by any of the usual skidding or assembly methods.

There they will be assembled to lie horizontally as a group, approximately in side-by-side alignment with each other. One end of the group so assembled will then be formed into a tightly held bundle by being engaged by power operated jaws. The engaged ends of the trees in this bundle will then be aligned with one another by suitable means, such as a butt plate movably mounted relatively to the jaws. A power driven saw located a predetermined distance along the trees from the aligning means is then moved transversely of the trees to cut through them and form bolts of timber. These bolts of timber continue to form a bundle held firmly in the jaws while the remaining tree portions are released. If desired, more than one saw may be used, the saws being spaced apart along the trees to form a plurality of bundles of bolts arranged end to end in the jaws. In a modification only a single large tree may be acted upon at any one time.

The jaws are mounted on a power driven vehicle which is now used to transport the bundle (or bundles) of bolts to a required location, for example, to an adjacent pile. The vehicle is then returned to the remaining tree portions to repeat the operation, such repetition continuing until the trees are consumed, or the few portions remaining are worthy only of manual removal from the site to make way for a fresh assemblage of full length trees.

Various mechanisms for carrying the invention into practice are illustrated diagrammatically in the accompanying drawings. These mechanisms are shown by way of example, the broad scope of the invention being limited only by the appended claims.

2

FIGURES 14a to 14c are diagrammatic plan views of the manner of use of the apparatus of FIGURE 13.

Figure 1:
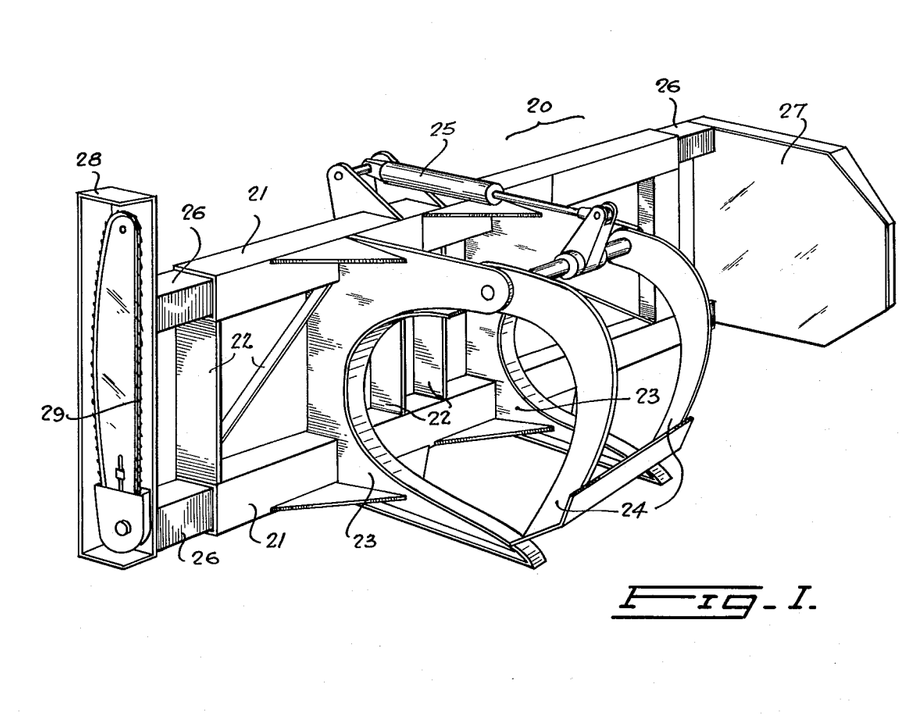
FIGURE 1 shows a first slashing and piling mechanism in perspective.

The slashing and piling mechanism of FIGURE 1 consists essentially of a frame 20 formed of a pair of spaced, parallel tubes 21 joined together by struts 22 and by the fixed jaws 23 of a power-operated grab. The movable jaws 24 of the grab are operated by suitable means, such as a hydraulic cylinder 25.

Within the tubes 21 of the frame 20 there is slidingly mounted a pair of members 26 which, at one end, support a butt plate 27 and, at the other end, carry the casing 28 of a chain saw 29. The inner frame constituted by members 26, plate 27 and saw casing 28 is thus longitudinally slidably mounted within the main frame 20, as demonstrated by a comparison between the full and broken line positions in FIGURE 3.

Figures 3, 4, 8, 9:
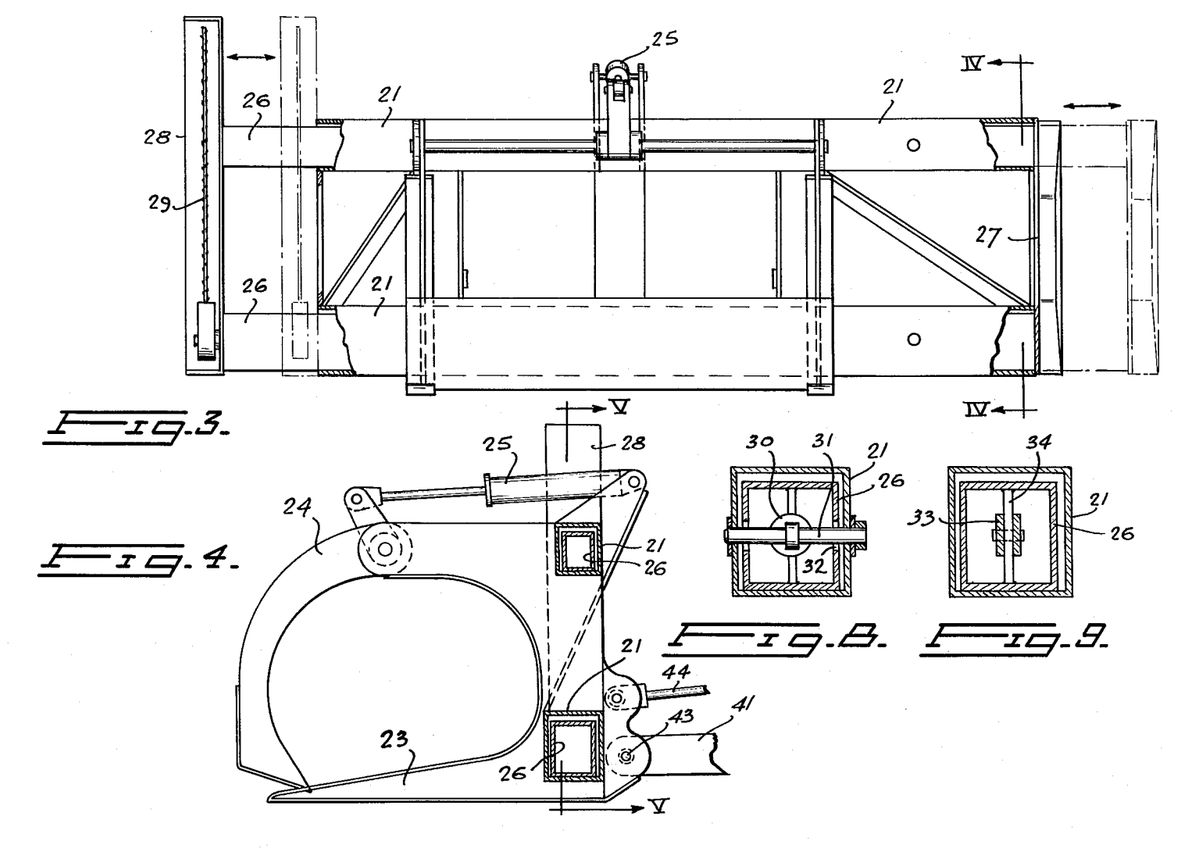
FIGURE 3 is a front elevation view of FIGURE 1.
FIGURE 4 is a section on IV—IV in FIGURE 3.
FIGURE 8 is a section on VIII—VIII in FIGURE 5.
FIGURE 9 is a section on IX—IX in FIGURE 5.
Figures 5, 6, 7:
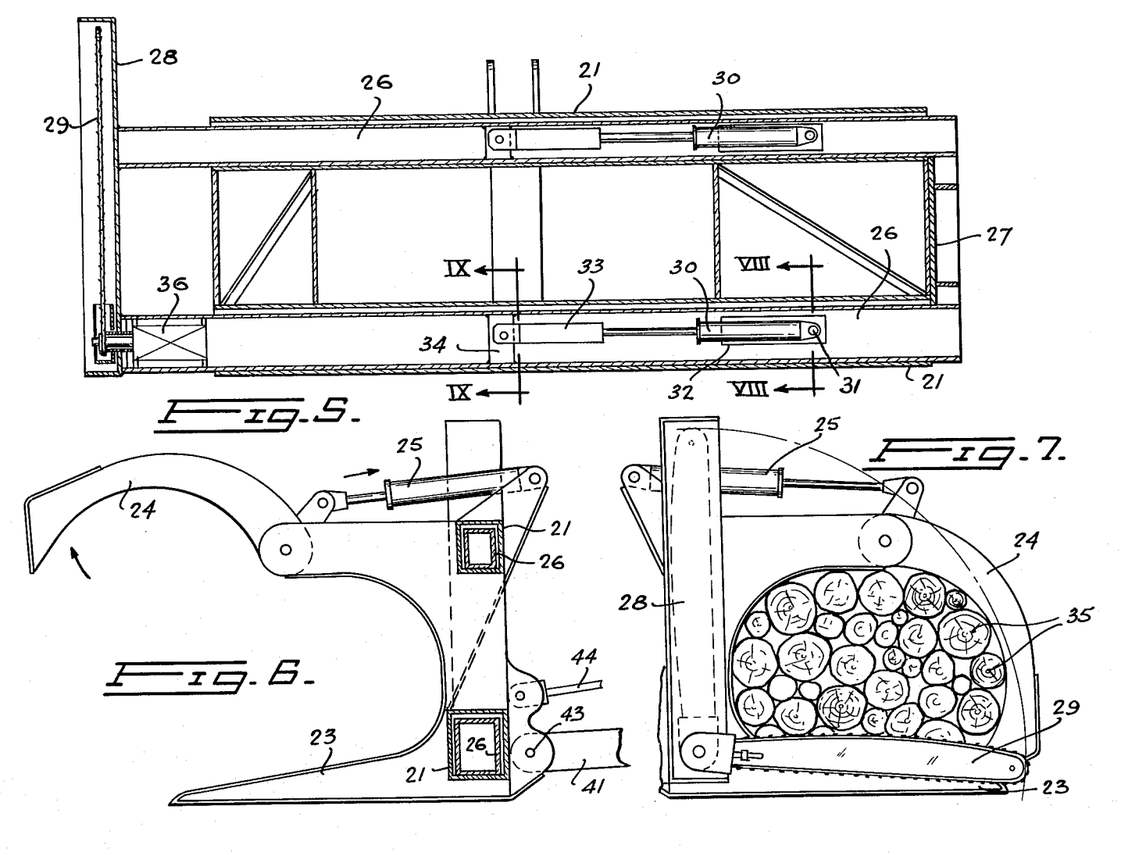
FIGURE 5 is a section on V—V in FIGURE 4.
FIGURE 6 is a view similar to FIGURE 4 with the parts in a different position.
FIGURE 7 is an end view of FIGURE 2.

As best seen from FIGURES 5, 8 and 9, this movement is controlled by hydraulic cylinders 30 mounted inside the tubes by means of pins 31 which project through slots 32 in the inner tubes 26 to be secured to the outer tubes 21. The pistons of cylinders 30 are each connected by a forked bracket 33 to a web 34. Each web 34 extends across the interior of a tube 26 and is fixed to the walls thereof.

Figure 2:
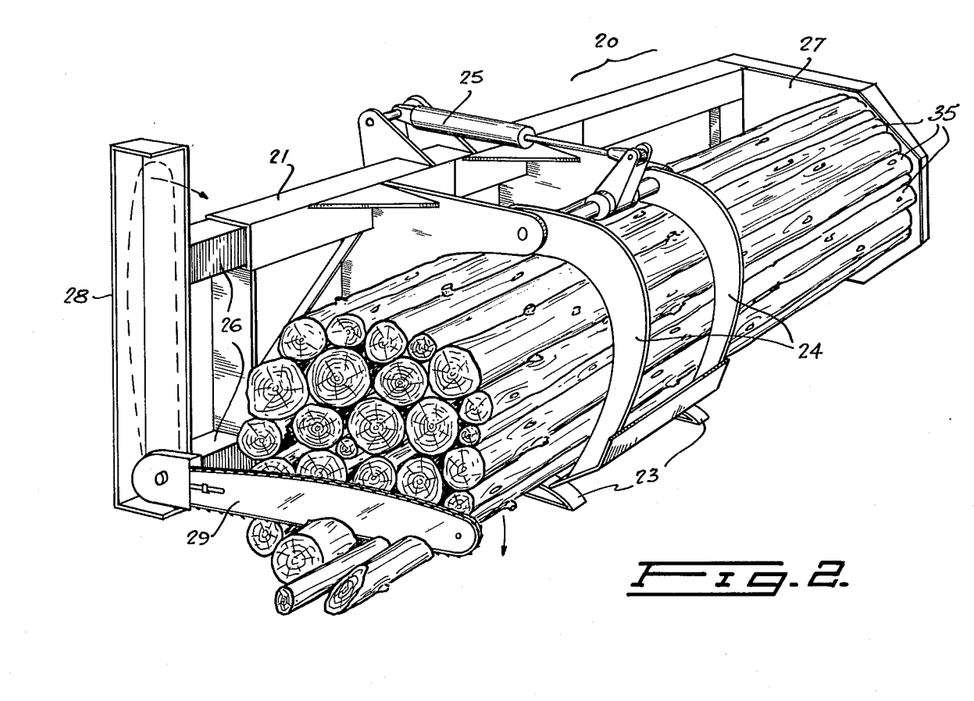
FIGURE 2 shows the same mechanism loaded with logs.

FIGURES 2 and 7 demonstrate the manner in which a group of trees can be picked up and held by the jaws 23, 24; the inner frame then moved to bring the butt plate 27 firmly against all the trees ends so as to align them with one another; and the saw 29 then lowered from its casing 28 to cut the trees to form bolts 35 of the required length, say 8 feet. Power for driving and lowering the saw is derived from a motor 36 (FIGURE 5) or from any other convenient source.

Figure 10:
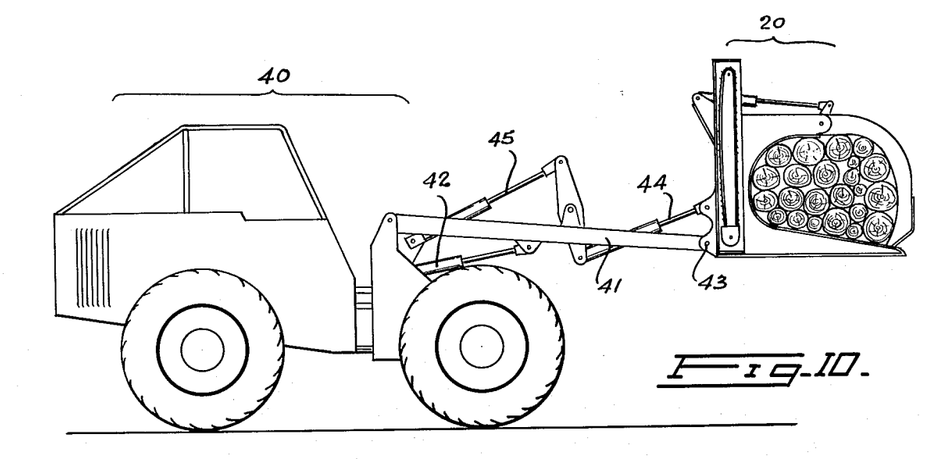
FIGURE 10 demonstrates the manner of mounting the mechanism of FIGURES 1 to 9 on a tractor.

The manner in which this mechanism is mounted on a tractor 40 is illustrated in FIGURE 10. Frame 20 is mounted on the ends of arms 41. These arms 41 can be raised and lowered by hydraulic cylinders 42, and the attitude of the mechanism can be changed by tilting the entire frame 20 and the parts connected thereto about pins 43 by link 44 controlled by cylinder 45. Alternatively, arms 41 could be hinged centrally and by means of an additional hydraulic cylinder, could be used to project or withdraw the frame 20 forwardly.

Figures 11A, 11B, 11C, 11D, 11E:
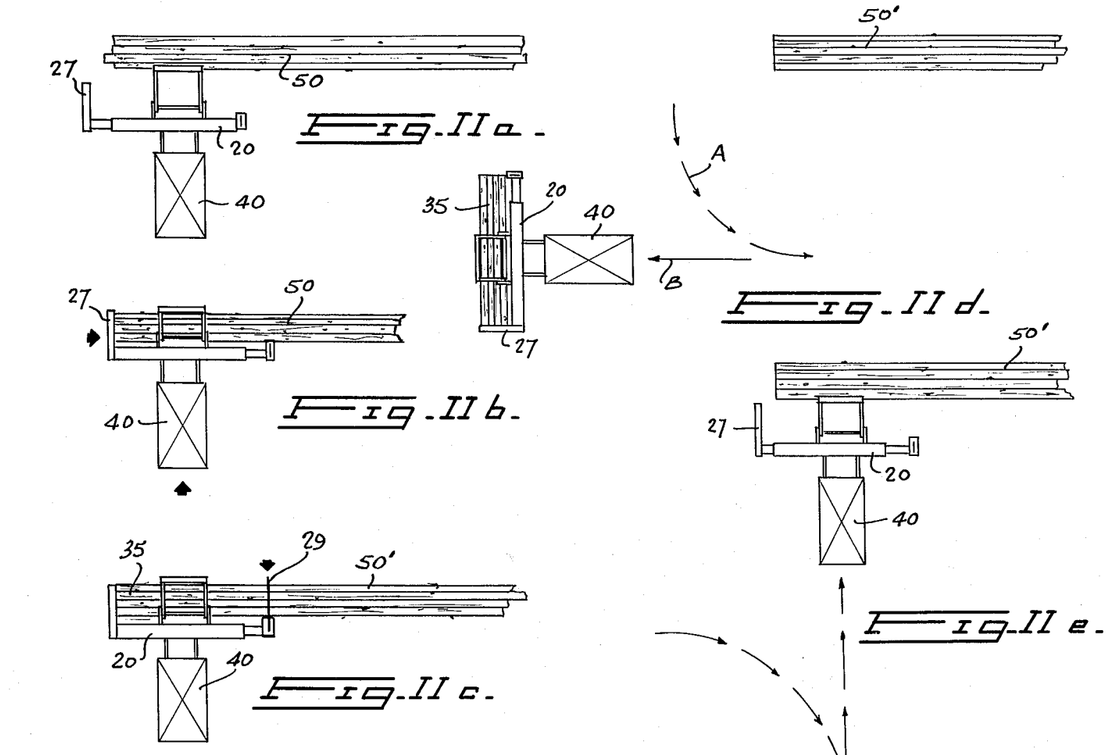
FIGURES 11a to 11e are diagrammatic plan views of the machine of FIGURE 10 in use at different stages in a piling and slashing operation.

The preferred manner of use of this equipment is demonstrated by the various parts of FIGURE 11. A group of limbed and topped trees 50 is assembled in rough side-by-side alignment with one another by tractors (not shown) or by other machinery or animals used to move the trees out from the forest to the slashing and piling location. The tractor 40 carrying the frame 20 and mechanism associated therewith, as described in connection with the foregoing figures, then approaches the trees 50 as shown in FIGURE 11a. The jaws 23, 24 are then caused to embrace one end of the group of trees to hold them as a tightly held bundle. The tree ends may be elevated from the ground during this operation or the lower trees may remain resting on the ground or on a bucking rack (a wooden platform having transversely extending slots to allow the jaws 23 to pass under the trees). The operator then energises the cylinders 30 to force the plate 27 against the free ends of the trees and thus align these ends with each other (FIGURE 11b). Even if the tree ends engaged by the jaws are slightly raised, the remote ends of the trees will rest on the ground during the cutting operation. This will facilitate alignment, and avoids the need for heavy lifting machinery capable of lifting a bundle of whole trees. The saw 29 is then lowered (FIGURE 11c) to cut off the bolts 35. These bolts continue to be held as a bundle by the jaws, while the remaining tree portions 50' are free to fall back if they had been elevated.

When this operation is complete, the operator drives the tractor 40 away from the trees in order to pile the bolts at a desired location. In FIGURE 11d it has been assumed that the tractor 40 is backed away (arrows A) and then moved forwards (arrows B) to bring the bolts 35 to the site of a pile of bolts (not further shown). Alternatively, the bolts 35 could be loaded directly onto a truck, sleigh, pallet or other conveyance. The direction of movement of the tractor 40 with the cut bolts 35 away from the remaining tree portions is clearly a matter of choice and convenience. The tractor 40 could be driven forwards to pile the bolts 35 at a site beyond the location of the trees, or, if the arms are made extensible as explained above, they can be operated to reach forward and achieve this result. As above indicated it will often be convenient in practice to assemble the trees 50 on a bucking platform in order to facilitate their being picked up by the jaws 23, 24 in which case it would normally be more convenient to back the tractor 40 away from the trees then to drive it forwards over the platform.

The important feature of this operation is not the direction in which the tractor 40 moves away, but the fact that this single machine (tractor 40 and the slashing and piling mechanism mounted on it) can align and slash (cut) a group of trees simultaneously; then pile the resulting bundle of bolts at any desired adjacent location; and finally return to the remaining tree portions 50' to repeat the operation (as demonstrated by FIGURE 11e.) This sequence can be repeated until the full length of the trees has been consumed, the trees, or what is left of them after each cut, remaining in the same position on the ground or bucking platform throughout the entire operation. This is an important point. Whenever whole trees are handled, for example, when assembling the trees 50, only one is handled at a time and is dragged into place. Whenever a group of tree portions is to be moved, these are, by the time, separated from the remainders of the trees. At no time is a group of whole trees required to be lifted or moved. As a result there is no need for the comparatively heavy machinery that has hitherto been required for slashing and piling operations. In the past it has been a common practice to drag the trees individually to a saw mill or other piece of machinery incorporating one or more saws. The fact that trees are much longer and heaver than cut bolts has given rise to this individual handling, slashing and piling of each tree. Alternatively, equipment hitherto in use and capable of handling several trees as a bunch was necessarily larger, since it was required to move the bunch as a unit load.

The present method and apparatus accomplish in an improved manner the operations that formerly required two separate mechanisms (one for slashing, one for piling); they enable a number of trees to be operated on (slashed and piled) simultaneously, that is as a group rather than individually; and yet they call for less massive and less costly equipment than prior methods. One reason for this later advantage lies in the fact that in the present invention the slashing and piling mechanism is taken to the group of trees, rather than the trees being brought to the slashing and piling mechanisms.

Figure 12:
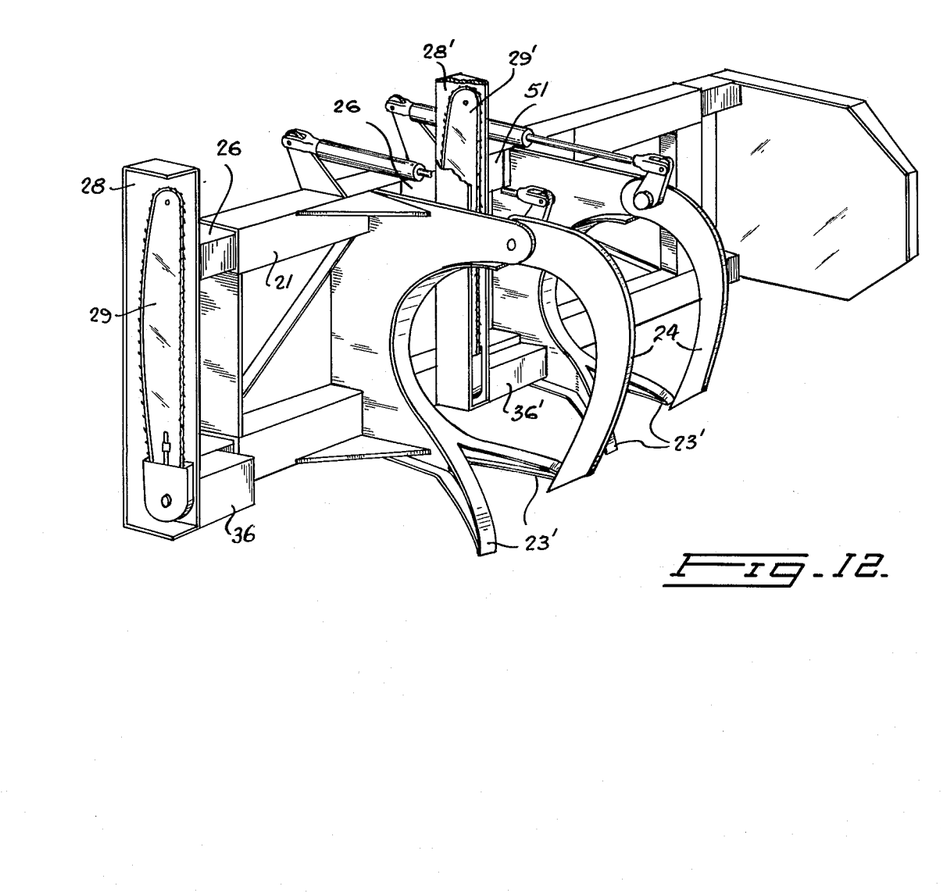
FIGURE 12 is a perspective view of a second form of slashing and piling mechanism.

The foregoing description assumes slashing into 8 foot bolts. The invention is equally applicable to the cutting of trees into other lengths, such as 16 foot bolts (when the mechanism may have correspondingly increased dimensions). When 4 foot bolts are required, the arrangement shown in FIGURE 12 may conveniently be used. This mechanism is basically similar to that of the foregoing figures, except that a second saw 29' has been added. This saw 29' driven by motor 36' is mounted in casing 28' secured to the inner tubes 26, this mounting being made through slots 51 in the outer tubes 21. In this way the jaws straddle the second saw 29' at all times. Lower jaws 23' are preferably forked at their ends, as shown, further to ensure adequate support for the two bundles of 4 foot bolts arranged end to end that the operation of both saws will produce. The subsequent piling will be essentially the same as has already been described with reference to FIGURE 11. As an alternative to the use of two saws, one saw can be provided movable between two or more positions on the frame relative to the butt plate. To facilitate piling and subsequent scaling operations, when two bundles of shorter bolts are formed, the two bundles can be separated endwise before piling by mounting the left hand pair of jaws 23', 24 (FIGURE 12) so as to be movable longitudinally of the main frame independently of the right hand pair of jaws 23', 24, and by providing an independent hydraulic cylinder to cause this motion.

Although chain saws have been illustrated and are the most convenient form of saw to employ, other types of saw such as an oscillating of circular saw may be used within the scope of the invention.

In the foregoing description it has been assumed that the butt plate 27 is movable longitudinally relatively to the jaws 23, 24. Although this will be the preferred construction, a simplified form of the apparatus having a fixed butt plate is possible. To use such a machine the operator could cause the jaws to embrace the trees with the apparatus turned slightly to one side. The operator would then slew the tractor in the direction to move the jaws along the trees towards their remote ends which will still be resting on the ground. This movement will force the but plate against the adjacent tree ends. The trees against which this force is applied will necesarily yield and move lengthways, while any trees with less projecting ends will tend to be checked by their ground-engaging remote ends. In this way (repeating the process of necessary) alignment can often be achieved by a skilled operator without the necessity of a movable butt plate.

Figure 13:
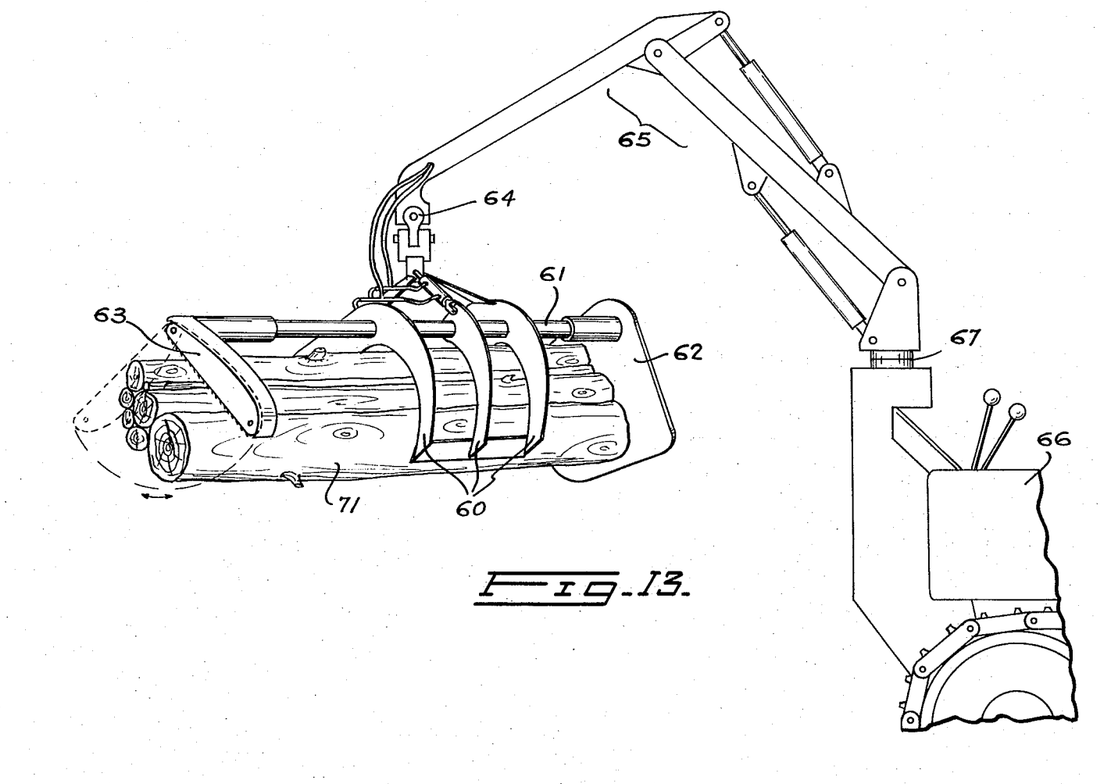
FIGURE 13 demonstrates an alternative manner of mounting a mechanism according to the invention on a tractor.
Figures 14A, 14B:
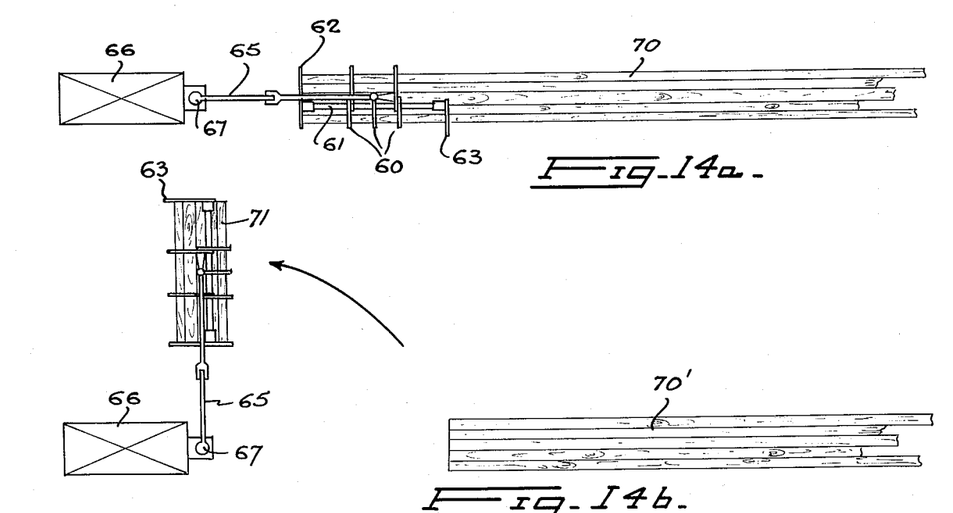

FIGURE 13 shows an alternative arrangement consisting of grappling jaws 60 mounted on frame 61 which is equipped, as before, with a butt plate 62 and a swingable saw 63. Frame 61 is supported through joint 64 on a conventional, extensible boom 65 mounted on a tractor or any suitable machine 66 by swivel mounting 67. The manner of use of this arrangement is shown in FIGURES 14a to c. FIGURE 14a shows the tractor 66 with the boom 65 projecting forwardly from it and the frame 61 supported by the boom to extend as a longitudinal continuation of the tractor axis. In this position the slashing and piling mechanism is lowered to engage the end of a group of trees 70. Having aligned the tree ends with the butt plate 62, the cut is made with saw 63 to cut off the bolts 71 which can then be lifted and swung to one side of piling by swinging the boom 65 about mounting 67 in the manner shown in FIGURE 14b. Note that backing and turning of the tractor is not required. A further cut is then made in the remaining tree portions 70' in the manner shown in FIGURE 14c by moving the tractor 66 forwards. If a boom 65 with sufficient reach is employed, no movement of the tractor at all may be required as the operation moves along the group of trees cutting bolts therefrom. In any event, at the most, only forward straight line motion of the tractor will be needed, which is preferred to the backing and turning of the tractor that is required when the tractor is situated beside the trees in the form of operation shown in FIGURE 1.

It should also be noted that with a movable boom arrangement a movable butt plate is not required to align the free ends, since the entire boom can be swung. Thus the simplified form with fixed butt plate as described above could be employed. This is particularly true when the machine moves parallel to the longitudinal axis of the trees. When working perpendicular to the tree axis either the fixed or moving butt plate constructions might be used.

In the event of a large tree (such as might be encountered in a vener logging operation) requiring to be handled, the apparatus described above may be used in accordance with a modified procedure. Only the large tree will be engaged at one time by the jaws. Normally the apparatus will not attempt to lift the tree at this time. The jaw tines will be slid under the tree end. Even if some lifting is carried out, it would be only of one end of the tree. After making the transverse saw cut, the bolt thus formed will be lifted and piled at the desired location. The machine will then be repositioned to act on the remaining tree portion in a like manner. As before, this method of operation avoids the need for lifting or moving a whole tree. Only each bolt needs to be handled, the mechanism being moved along the tree as bolts are cut from it.

We claim:

1. In a timber harvesting operation, a method comprising the steps of
   (a) assembling a group of felled and limbed trees lying approximately in side-by-side alignment with one another,
   (b) firmly encircling one end only of said group of trees to grasp said trees at said one end of said group as a bundle,
   (c) then simultaneously aligning the encircled ends of said trees while so grasping them as a bundle,
   (d) then making a transverse cut through the trees at a predetermined distance from their aligned ends to form bolts of timber while continuing to hold said bolts as a bundle and freeing the remaining tree portions,
   (e) transporting the bundle of bolts so obtained to a selected location and there releasing said bundle of bolts,
   (f) and repeating steps (b) to (e) with the group referred to in step (b) now constituted by the remaining tree portions.

2. In a timber harvesting operation, a method comprising the steps of
   (a) assembling a group of felled and limbed trees lying approximately in side-by-side alignment with one another,
   (b) driving to the site of such assemblage a power operated vehicle carrying a slashing and piling mechanism comprising
      (i) power operated jaws,
      (ii) means movable relatively to said jaws for aligning the ends of trees held therein,
      (iii) and a power driven saw mounted in predetermined spaced relation to said aligning means,
   (c) firmly encircling with said jaws one end only of said group of trees to grasp said trees at said one end of said group as a bundle,
   (d) then employing said aligning means to align simultaneously the ends of said trees while continuing to grasp them as a bundle,
   (e) traversing said saw through the trees to separate bolts of timber from the remaining tree portions while continuing to hold said bolts as a bundle and freeing said remaining portions,
   (f) transporting the bundle of bolts so obtained to a selected piling location and there opening said jaws to release said bundle of bolts,
   (g) returning said mechanism to said remaining tree portions,
   (h) and repeating steps (c) and (f) with the group referred to in step (c) now constituted by the remaining tree portions.

3. A method according to claim 2, wherein
   (a) said vehicle is initially located in a first position beside said assemblage of trees with its direction of travel perpendicular to the longitudinal extent of the trees,
   (b) and said returing step is effected by moving said vehicle to a second position displaced sideways from the first position, the vehicle when in the second position having its direction of travel perpendicular to the longitudinal extent of the remaining tree portions, the location of which portions has remained unaltered during the operation.

4. A method according to claim 2, wherein
   (a) said vehicle is initially located in a first position beside said assemblage of trees with its direction of travel perpendicular to the longitudinal extent of the trees,
   (b) said transporting step is effected by moving said vehiule away from said first position to the piling location,
   (c) and said returning step is effected by moving said vehicle to a second position displaced sideways from the first position, the vehicle when in the second position having its direction of travel perepndicular to the longitudinal extent of the remaining tree portions, the location of which portions has remained unaltered during the operation.

5. A method according to claim 2, wherein
   (a) said vehicle is initially located in a first position displaced endwise of said assemblage of trees with its direction of travel parallel to the longitudinal extent of the trees,
   (b) said mechanism is mounted on a swinging boom projecting forwardly of said vehicle,
   (c) said transporting step is effected by swinging said boom to bring said mechanism to the piling location,
   (d) and said returning step is effected by returning said boom to a condition projecting forwardly of the vehicle and advancing said mechanism to the location of the remaining tree portions, which location has remained unaltered during the operation.

6. A method according to claim 5, wherein said advancing of the mechanism is effected by extending the boom while holding the vehicle stationary.

7. A method according to claim 6, wherein said advancing of the mechanism is effected by moving the vehicle forwards substantially in a straight line.

8. Apparatus comprising
   (a) a power operated vehicle,
   (b) and a slashing and piling mechanism mounted on said vehicle,
   (c) said mechanism comprising
      (i) jaw means for picking up a group of felled and limbed trees simultaneously and holding said trees in a bundle,
      (ii) means for aligning with one another all of the ends of said tree bundle,
      (iii) means mounting said aligning means and said jaw means for relative movement therebetween in the longitudinal direction of the trees held in said jaw means with said aligning means projecting across the full extent of said jaw means in closed position,
      (iv) at least one power driven saw,
      (v) means mounting said saw for relative movement between said saw and said jaw means in said longitudinal direction,
      (vi) and means spacing said saw a predetermined distance along the mechanism in said longitudinal direction from said aligning means, with said jaw means between said saw and said aligning means,
      (vii) said saw being movable transversely of the trees to cut through the same and form a bundle of bolts of timber retained in said jaws and separated from the remaining tree portions.

9. Apparatus comprising
   (a) a power operated vehicle,
   (b) and a slashing and piling mechanism mounted on said vehicle,
   (c) said mechanism comprising
      (i) an elongated main frame, (ii) jaw means mounted on said frame to project therefrom at a fixed location therealong, said jaw means being movable between open and closed positions for embracing a group of felled and limbed trees simultaneously and holding said trees in a bundle, (iii) an elongated movable frame mounted on said main frame for sliding movement longitudinally thereof, (iv) a planar butt plate secured to one end of said movable frame to project therefrom across the full extent of said jaw means in closed position whereby to project into engagement with the ends of all the trees of said bundle, (v) means for moving said movable frame relatively to the main frame to force said butt plate against said ends to align the same with one another, (vi) a power driven saw mounted on said movable frame at a location therealong spaced a predetermined distance from said butt plate, (vii) and means for moving said saw in a plane parallel to that of the butt plate to cut through the trees and form bolts of timber, (viii) the limits of sliding movement of said movable frame being such that said jaw means are always located between said saw and said butt plate for said jaw means to retain said bolts as a bundle while releasing the remaining tree portions.

10. Apparatus according to claim 9, wherein said saw is located at the end of said movable frame remote from said butt plate.

11. Apparatus according to claim 10, including (a) a second power driven saw mounted on said movable frame at a location therealong intermediate the first saw and said butt plate, (d) and means for moving said second saw in a plane parallel to the plane of movement of the first saw to cut through the trees and, together with the first saw, to form two bundles of bolts of timber disposed end to end, (c) and wherein said jaw means include jaw pairs straddling the location of said second saw in all relative positions of said frames whereby to retain both said bundles.

12. Apparatus according to claim 11, including means for moving a first of said jaw pairs longitudinally of said main frame independently of a second of said jaw pairs in order to space apart the two bundles of bolts endwise of each other.

References Cited by the Examiner
UNITED STATES PATENTS

| | | | |
|---|---|---|---|
| 460,049 | 9/1891 | Hill | 143—57 |
| 2,234,990 | 3/1941 | Todhunter | 143—51 |
| 2,418,251 | 4/1947 | Drott | 214—140 |
| 2,635,659 | 4/1953 | Gerdine | 144—3 |
| 2,833,433 | 5/1958 | Paananen | 214—147 |
| 2,882,941 | 4/1959 | Pope | 144—3 |
| 2,948,311 | 8/1960 | McCollum | 144—2 |

HAROLD D. WHITEHEAD, *Primary Examiner.*

WILLIAM W. DYER, JR., *Examiner.*